July 20, 1954  J. W. GELLENBECK  2,683,950
AERATED MINNOW PAIL

Filed May 26, 1950  2 Sheets-Sheet 1

Inventor
John W. Gellenbeck
By Williamson & Williamson
Attorneys

July 20, 1954     J. W. GELLENBECK     2,683,950
AERATED MINNOW PAIL
Filed May 26, 1950     2 Sheets-Sheet 2
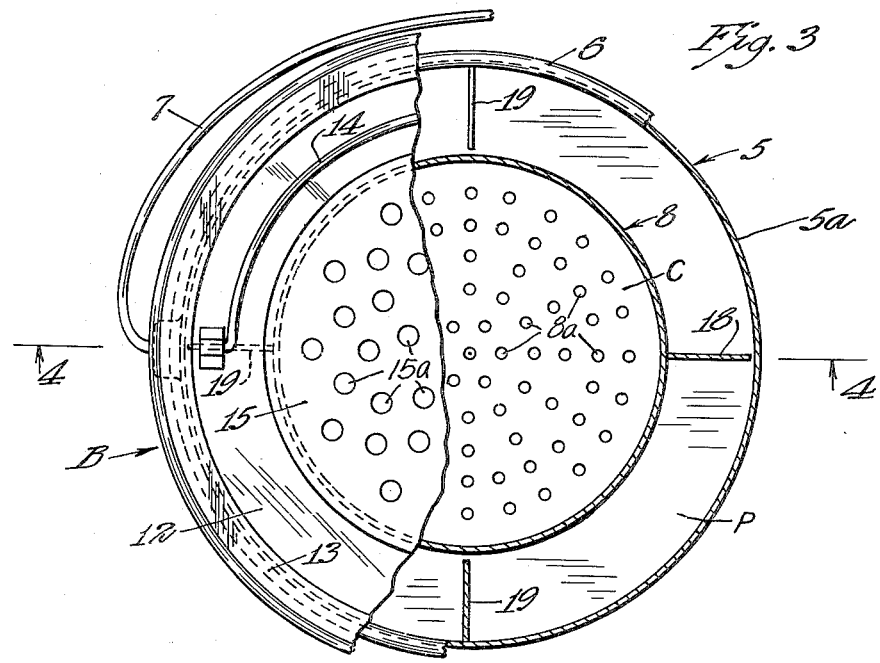
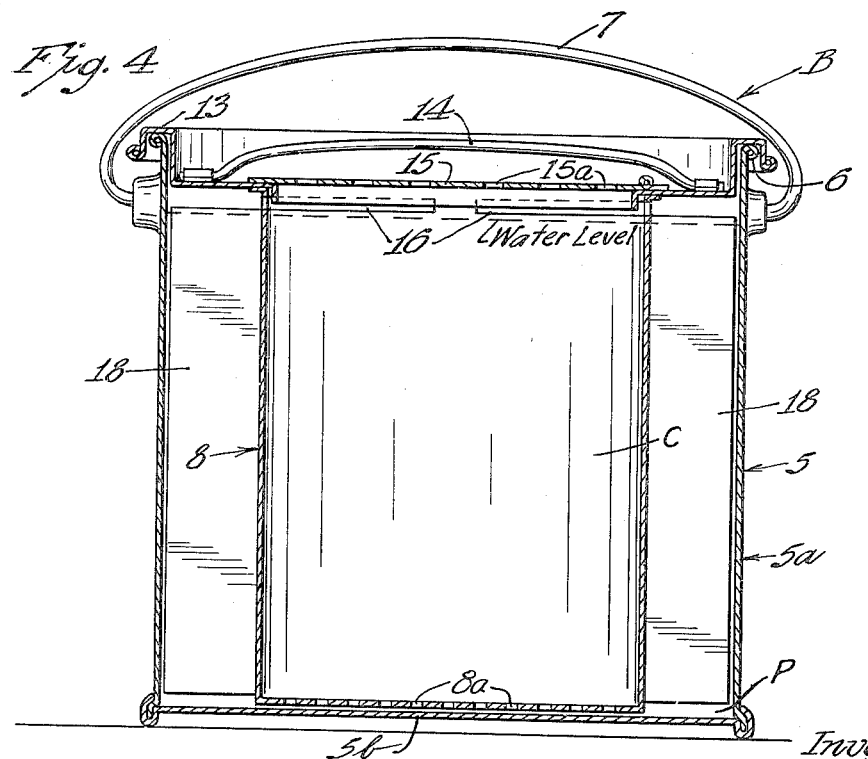
Inventor
John W. Gellenbeck
By Williamson & Williamson
Attorneys Patented July 20, 1954

2,683,950

UNITED STATES PATENT OFFICE 2,683,950

AERATED MINNOW PAIL

John W. Gellenbeck, Shakopee, Minn., assignor of one-fourth to John Cameron, Shakopee, Minn.

Application May 26, 1950, Serial No. 164,366

8 Claims. (Cl. 43—56)

This invention relates to a minnow pail constructed to permit periodic efficient aeration of the water therein.

In the past many minnow pails have been invented which have for their prime purpose the aeration of the water therein. However, most of these are extremely complicated and do not produce efficient aeration of the water.

It is an object of my invention to provide an extremely simple, yet very efficient, minnow pail constructed to permit the water therein to be effectively aerated to keep the minnows in a healthy condition for relatively long periods of time.

More specifically, it is an object to provide a minnow pail for aerating the water, in which the water is caused to pass through the air rather than passing the air through the water, thereby permitting very efficient aeration of the water.

Still more specifically, it is an object to provide a minnow pail having an outer substantially cylindrical shell and a substantially smaller inner cylindrical shell concentrically mounted for oscillation therein and forming an annular chamber between the two shells, a number of water agitating elements being provided in said chamber to cause an overflowing of water from said chamber into said inner shell through openings provided in the upper portion of the inner shell above the water level.

It is another object to provide a minnow pail of the class described having two forms of agitating elements, one form constituting substantially radially disposed fins and the other constituting scoops, said elements being fixed to the outside of the inner shell and working in cooperation with water damming elements fixed to the inside of the outer shell to cause overflowing of the water from the chamber between the two shells into the inner shell.

These and other objects and advantages of my invention will more fully appear from the following description made in connection with the accompanying drawings wherein like reference characters refer to similar parts throughout the several views and in which:

Fig. 3 is a top plan view of my minnow pail with a portion thereof broken away to illustrate an alternative form thereof; and Fig. 4 is a vertical sectional view taken substantially along the line 4—4 of Fig. 3.

Figure 1:
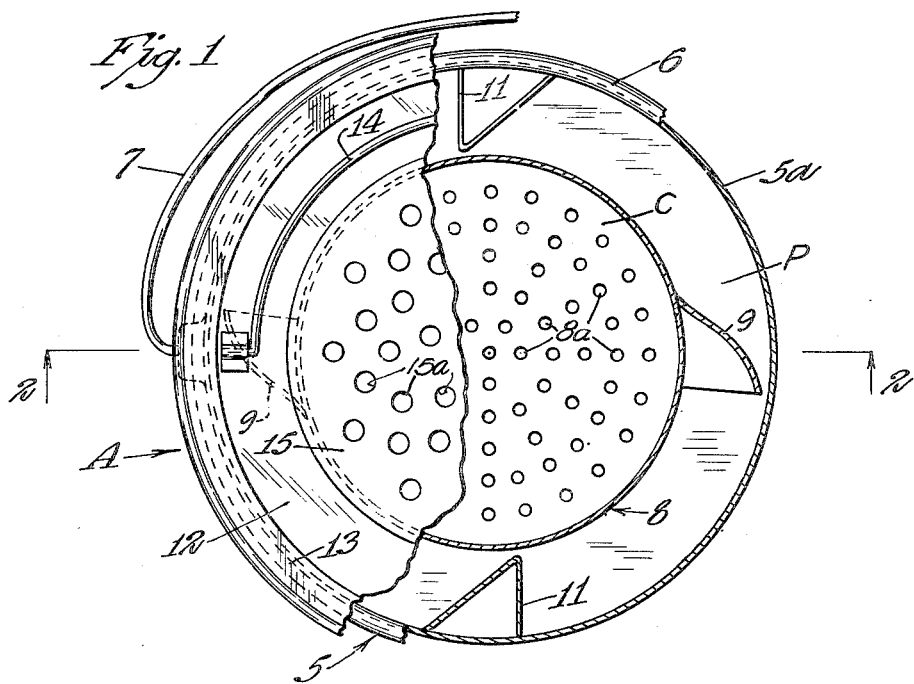
Fig. 1 is a top plan view of my improved minnow pail with a portion thereof broken away to show portions of the unit in horizontal section.

As illustrated in the accompanying drawings, I provide an open-topped outer shell or container designated as an entirety by the numeral 5, and in the form shown, having the cylindrical sides 5a and the circular bottom 5b sealingly connected to the bottom extremities of said sides. A reinforcement bead 6 is formed around the upper peripheral portion of the sides 5a and a carrying handle 7 is pivotally mounted on the upper side portions 5a.

Figure 2:
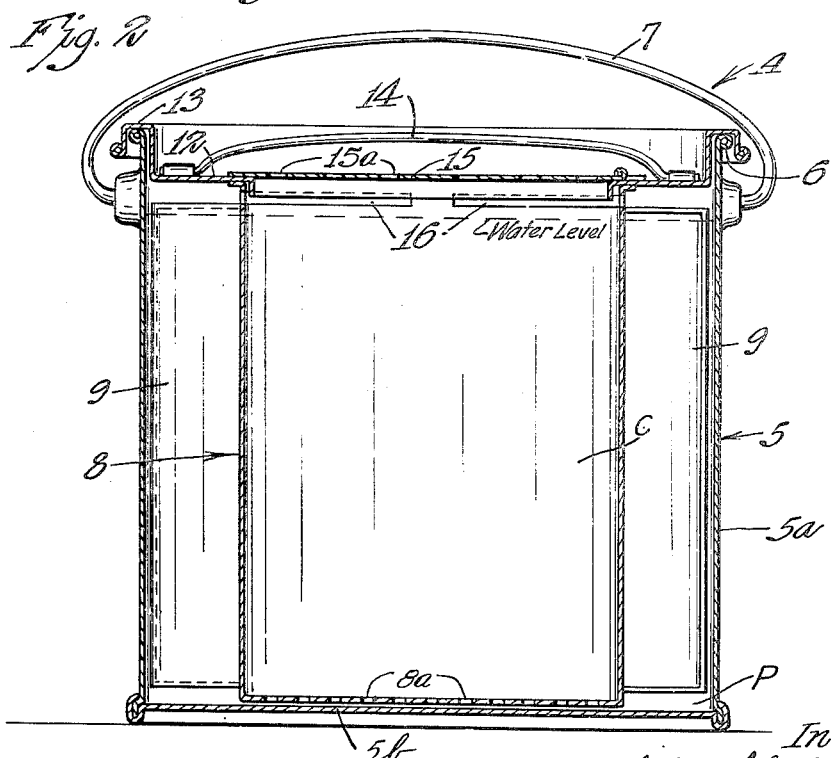
Fig. 2 is a vertical sectional view taken substantially along the line 2—2 of Fig. 1.

An inner substantially cylindrical shell designated as an entirety by the numeral 8 is concentrically mounted within the shell 5 in spaced relation thereto to form an annular passage or chamber P between said outer and inner shells. In the form illustrated in Figs. 1 and 2 and designated by the letter A, a number of outwardly extending scoops, such as the pair of diametrically opposed scoops 9, are fixed to the outer cylindrical side walls of inner shell 8 and are substantially longitudinally coextensive therewith and extend laterally substantially across said passage, in the form shown.

In the form illustrated, a pair of water damming elements 11 are fixed to the outer shell 5 and extend inwardly substantially across said annular passage. An annular top member 12 is fixed to the top extremity of the cylindrical shell 8 and has a bead receiving circular trackway 13 to permit oscillation of the inner shell 8 within the outer shell 5. A suitable gripping handle 14 is mounted across the top of the annular top member 12 to facilitate oscillation of said inner shell. The bottom of the inner shell 8 is perforated 8a to permit communication between the annular passage P and the minnow confining chamber C within. A top closure 15 is hingedly mounted across the top opening formed in said annular top member 12 to permit access to the inner portion of the inner shell 8 and has a plurality of perforations 15a formed therein. The handle 14 is, of course, swingably mounted on said annular top member 12 to provide clearance for said hinged top closure 15 to be opened. A number of circumferentially disposed inlet openings, such as the elongated slots 16, are formed around the upper marginal portion of the inner shell 8 above the water level to permit overflowed water to flow inwardly therethrough into the inner shell.

The following is a description of the aeration operation of my improved minnow pail. The inner and outer shells 5 and 8 are initially filled with water to a level disposed a slight distance below the overflow inlet slots 16. The perforations in the bottom of inner shell 8, of course, afford communication between the annular chamber P formed between the shells and the minnow confining chamber C within the inner shell. The minnows are then placed in the inner shell by opening the top closure 15. As the minnows use up the oxygen in the water within the minnow pail it is necessary to aerate this water to keep the minnows alive. This is done by oscillating the inner shell back and forth within the outer shell, whereby the scoops 9 combine with the damming elements 11 to overflow the water inwardly into the inner shell through the slots 16 in the upper portion of said inner shell 8, thus causing the water to pass through the air in the upper portion of the inner shell 8 and carry this air back into the water to replenish the oxygen therein. Air is supplied to the space within the inner shell 8 above the water level, through the perforations in the hinged top 15. I have found that by passing the water through the air rather than by forcing air through the water considerably more efficient aeration of the water is produced and this is the principle upon which my minnow pail has been constructed, as disclosed herein.

An alternative form of my invention is illustrated in Figs. 3 and 4 and is designated by the letter B. This form of my invention is similar in all respects to the structure disclosed for form A of my invention and for purposes of convenience like reference characters will refer to similar parts in the two forms. The agitating elements of form B are the only differentiating features of the construction thereof and the agitating elements in form B constitute radially disposed fins designated by the numeral 18 which are fixed to the inner shell. The overflow damming elements fixed to the outer shell could be constructed similarly to those shown in form A and designated by the numeral 11, but in form B are shown as radially disposed fins fixed to the inner shell and designated by the numeral 19.

The operation of form B of my invention is identical with the operation for form A, as previously described. However, form B of my invention is a somewhat simplified construction and should be less expensive to manufacture.

It will be seen that I have provided a relatively simple, yet highly efficient minnow pail disclosed in two forms, A and B, both designed to aerate the water by passing a flow of water through the air to permit minnows to be kept in a healthy condition within the pail for relatively long periods of time.

It will, of course, be understood that various changes may be made in the form, details, arrangement and proportions of the parts without departing from the scope of my invention.

What I claim is:

1. A container for live bait and the like comprising an outer water confining shell, an inner shell journalled for rotation within said outer shell and being substantially smaller than said outer shell to provide a chamber between said two shells, a number of substantially rigid cooperating elements extending into said chamber, certain of said elements being fixed to the outer shell and extending inwardly therefrom, and certain of said elements being fixed to said inner shell in outwardly extending relation thereto and radially overlapping the outwardly extending elements, and said inner shell having openings in at least the top portion of the side wall thereof above the water normal line when said shells are stationary and disposed substantially adjacent the outwardly extending elements on at least one side thereof to permit water to be overflowed therethrough during the oscillation of the inner shell within the outer shell.

2. The structure set forth in claim 1, said shells constituting concentric substantially cylindrical members, and all of said rigid elements extending substantially the entire distance across said chamber.

3. A container for live bait and the like comprising an outer water confining shell, an inner shell journalled for rotation within said outer shell and being substantially smaller to provide a chamber between said two shells, a number of scoops fixed to the inner shell and extending outwardly therefrom substantially across the entire chamber, a number of cooperating water damming overflow elements fixed to said outer shell and extending inwardly therefrom substantially across said chamber, and said inner shell having openings therein in the top portion thereof above the normal water line when said two shells are stationary and in the lower portion thereof substantially adjacent the bottom of the inner shell.

4. A container for live bait and the like comprising an outer water confining shell, an inner shell journalled for rotation within the outer shell and being substantially smaller than the outer shell to provide a chamber between said two shells, a number of fins mounted on said inner shell and extending outwardly therefrom substantially across said chamber, a number of cooperating damming elements fixed to the outer shell and extending inwardly therefrom substantially across said chamber, and said inner shell having openings in the upper portion thereof above the normal water line when said two shells are stationary.

5. The structure set forth in claim 4, and said shells constituting concentrically disposed substantially cylindrical members, and said inner shell having openings in the bottom thereof.

6. A container for live bait and the like comprising an imperforate outer water confining shell, an inner shell journaled for rotation within said outer shell and being substantially smaller than the outer shell to provide a first chamber between two said shells, said inner shell defining a second chamber therewithin and being substantially imperforate along the side walls thereof except for a plurality of openings in the top portion of said side walls, a number of cooperating water engaging elements extending into said first chamber, certain of said elements being fixed to the outer shell and extending inwardly therefrom and certain other of said elements being fixed to the inner shell in outwardly extending relation therefrom and radially overlapping the outwardly extending elements, said openings in the upper portion of the side wall of the inner shell being disposed above the normal water line when said shells are stationary and being disposed substantially adjacent the outwardly extending water engaging elements to permit water to be overflowed therethrough during the oscillation of the water engaging elements within the chamber between said two shells, said inner shell having restricted intercommunication means at the lower portion thereof to permit the water overflowed thereinto through the openings in the upper portion thereof to flow back into the outer shell.

7. A container for live bait and the like comprising an imperforate outer water confining shell, an inner shell journaled for rotation within said outer shell and being substantially smaller than said outer shell to produce a chamber between said two shells, said shell being substantially cylindrical and said chamber being substantially annular in shape, a plurality of radially disposed fins fixed in outstanding relation to the outside of said inner shell and extending substantially the entire distance across said annular chamber and formed respectively from plate-like members having a plain surface on both sides thereof, a similar number of cooperating damming elements fixed in inwardly extending relation from the outer shell and extending a substantial distance inwardly therefrom across said annular chamber in opposed overlapping relation to the respective outwardly extending fins whereby back and forth oscillation of the inner shell will produce overflowing of the water over the tops of said fins, said inner shell having openings in the upper portion thereof above the tops of said fins whereby the overflowing water will flow therethrough and downwardly into the inner shell, said inner shell having openings in the lower portion thereof to permit the level in the two shells to be maintained substantially constant.

8. A container for live bait and the like comprising a cylindrical imperforate outer water confining shell, a cylindrical inner shell journaled for rotation within the outer shell and being of substantially smaller diameter than the outer shell to provide an annular chamber between said two shells, a plurality of peripherally spaced scoops fixed to the inner shell and extending substantially the entire distance across the annular chamber between said two shells, a similar number of similarly spaced water damming elements fixed to the outer shell and extending inwardly therefrom substantially the entire distance across said annular chamber in respectively opposed relation to said scoops whereby overflowing of water over the tops of said scoops will be produced by oscillation of the inner shell in the outer shell, said inner shell having a plurality of openings respectively adjacent said scoops and disposed above the tops thereof to receive the overflow of water therethrough to permit the same to pass inwardly into said inner shell, and said inner shell having openings in the lower portion thereof to permit the level in the two shells to be maintained substantially constant.

References Cited in the file of this patent

UNITED STATES PATENTS

| Number | Name | Date |
|---|---|---|
| 66,949 | Cook | July 23, 1867 |
| 130,331 | Strohecker et al. | Aug. 6, 1872 |
| 471,334 | Depp | Mar. 22, 1892 |
| 692,466 | Morris | Feb. 4, 1902 |
| 907,766 | Foster | Dec. 29, 1908 |
| 913,379 | Hart | Feb. 23, 1909 |
| 1,525,911 | Blake | Feb. 10, 1925 |
| 2,272,561 | Hubbell | Feb. 10, 1942 |
| 2,297,843 | Sharpnack | Oct. 6, 1942 |

FOREIGN PATENTS

| Number | Country | Date |
|---|---|---|
| 1,821 | Great Britain | 1864 |